(12) United States Patent
Faßbender et al.

(10) Patent No.: US 11,058,964 B2
(45) Date of Patent: Jul. 13, 2021

(54) TOY

(71) Applicant: BOXINE GMBH, Düsseldorf (DE)

(72) Inventors: Patric Faßbender, Düsseldorf (DE);
Marcus Stahl, Düsseldorf (DE);
Christian Wilmanns, Kaarst (DE)

(73) Assignee: BOXINE GMBH, Düsseldorf (DE)

( * ) Notice: Subject to any disclaimer, the term of this patent is extended or adjusted under 35 U.S.C. 154(b) by 0 days.

(21) Appl. No.: 16/071,845

(22) PCT Filed: Jan. 17, 2017

(86) PCT No.: PCT/EP2017/000046
§ 371 (c)(1),
(2) Date: Jul. 20, 2018

(87) PCT Pub. No.: WO2017/129349
PCT Pub. Date: Aug. 3, 2017

(65) Prior Publication Data
US 2019/0030452 A1 Jan. 31, 2019

(30) Foreign Application Priority Data

Jan. 25, 2016 (DE) ...................... 10 2016 000 630.7

(51) Int. Cl.
*A63H 33/26* (2006.01)
*A63H 3/28* (2006.01)
(Continued)

(52) U.S. Cl.
CPC ............... *A63H 33/26* (2013.01); *A63H 3/28* (2013.01); *A63H 5/00* (2013.01); *A63H 33/00* (2013.01); *A63H 2200/00* (2013.01)

(58) Field of Classification Search
CPC .......... A63H 33/26; A63H 33/00; A63H 3/28; A63H 5/00; A63H 2200/00
(Continued)

(56) References Cited

U.S. PATENT DOCUMENTS 1,535,035 A 4/1925 Richard
3,706,158 A 12/1972 Jensen
(Continued)

FOREIGN PATENT DOCUMENTS

CN 1323643 A 11/2001
CN 101290718 A 10/2008
(Continued)

OTHER PUBLICATIONS

Trigger—Android Apps auf Google Play. https://web.archive.org/web/20131213060042/https://play.google.com/store/apps/details?id=com.jwsoft.nfcactionlauncher&hl=de. Dated Dec. 6, 2013. 2 pages.
(Continued)

*Primary Examiner* — Eugene L Kim
*Assistant Examiner* — Rayshun K Peng
(74) *Attorney, Agent, or Firm* — Howard IP Law Group, PC

(57) ABSTRACT

A toy for replaying music or a spoken story, includes a loudspeaker or a loudspeaker terminal, a sensor which within a region of its surroundings can detect a property or a change in a property of said surroundings, and a control unit that can drive the loudspeaker or the loudspeaker terminal to replay music or a spoken story if the sensor senses, within a region of its surroundings, a specific property or a specific change in a property of the surroundings or when the control unit detects a specific change in the property detected by the sensor. The toy also includes a toy identification and a mechanism for transmitting a signal that is dependent on the toy identification.

16 Claims, 2 Drawing Sheets

(51) Int. Cl.
*A63H 5/00* (2006.01)
*A63H 33/00* (2006.01)

(58) Field of Classification Search
USPC ........................................................ 446/397
See application file for complete search history.

(56) References Cited

U.S. PATENT DOCUMENTS

| | | | |
|---|---|---|---|
| 5,334,022 A | 8/1994 | Kitagawa et al. | |
| 5,811,896 A | 9/1998 | Grad | |
| 6,171,168 B1 | 1/2001 | Jessop | |
| 6,190,174 B1* | 2/2001 | Lam | A63H 33/42 |
| | | | 273/237 |
| 6,330,427 B1 | 12/2001 | Tabachnik | |
| 6,887,121 B2* | 5/2005 | Whitehead | A63H 3/52 |
| | | | 446/129 |
| 7,038,567 B2 | 5/2006 | Vicentelli | |
| 7,081,033 B1 | 7/2006 | Mawle et al. | |
| 7,261,612 B1 | 8/2007 | Hannigan et al. | |
| 7,674,184 B2 | 3/2010 | Briggs et al. | |
| 8,287,327 B1 | 10/2012 | Ghaly | |
| 8,324,492 B2 | 12/2012 | Feeney et al. | |
| 8,382,550 B2 | 2/2013 | Kang | |
| 8,515,092 B2 | 8/2013 | Rucker | |
| 8,700,739 B2 | 4/2014 | Khedouri et al. | |
| 8,838,976 B2 | 7/2014 | Etchegoyen | |
| 9,569,977 B2 | 2/2017 | Binyamin | |
| 2002/0072293 A1 | 6/2002 | Beyo et al. | |
| 2002/0193047 A1 | 12/2002 | Weston | |
| 2003/0153238 A1 | 8/2003 | Chan | |
| 2004/0214642 A1* | 10/2004 | Beck | A63F 13/327 |
| | | | 463/40 |
| 2006/0003664 A1 | 1/2006 | Yeh | |
| 2006/0068366 A1 | 3/2006 | Chan et al. | |
| 2006/0154726 A1* | 7/2006 | Weston | A63F 13/98 |
| | | | 463/37 |
| 2007/0093170 A1 | 4/2007 | Zheng | |
| 2007/0234883 A1 | 10/2007 | Koizumi | |
| 2007/0259594 A1 | 11/2007 | Galbiati et al. | |
| 2008/0014829 A1 | 1/2008 | Dyer et al. | |
| 2008/0153594 A1 | 6/2008 | Zheng | |
| 2008/0316031 A1 | 12/2008 | Kalama et al. | |
| 2010/0160054 A1 | 6/2010 | Henry | |
| 2011/0151746 A1 | 6/2011 | Rucket | |
| 2011/0181399 A1 | 7/2011 | Pollack et al. | |
| 2012/0056722 A1 | 3/2012 | Kawaguchi | |
| 2012/0132710 A1 | 5/2012 | Loeffler et al. | |
| 2013/0072083 A1 | 3/2013 | Ghaly | |
| 2013/0237152 A1 | 9/2013 | Taggar et al. | |
| 2014/0033583 A1 | 2/2014 | Larson et al. | |
| 2014/0162785 A1 | 6/2014 | Reiche et al. | |
| 2015/0290545 A1 | 10/2015 | Barney | |
| 2015/0290548 A1* | 10/2015 | Meyers | A63H 30/04 |
| | | | 446/397 |
| 2015/0375134 A1* | 12/2015 | Zhang | A63F 13/21 |
| | | | 446/484 |
| 2016/0101370 A1 | 4/2016 | Madsen et al. | |
| 2016/0375373 A1 | 12/2016 | Fassbender et al. | |
| 2018/0353869 A1† | 12/2018 | Corkin | |
| 2019/0030452 A1 | 1/2019 | Fassbender et al. | |

FOREIGN PATENT DOCUMENTS

| | | | |
|---|---|---|---|
| CN | 101357269 A | 2/2009 | |
| CN | 101454057 A | 6/2009 | |
| CN | 101472653 A | 7/2009 | |
| CN | 201299974 Y | 9/2009 | |
| CN | 101983395 A | 3/2011 | |
| CN | 102058980 A | 5/2011 | |
| CN | 102172433 A | 9/2011 | |
| CN | 102631784 | 8/2012 | |
| CN | 202569452 U | 12/2012 | |
| DE | 19929404 A1 | 12/2000 | |
| DE | 10 2007 045 129 A1 † | 4/2009 | |
| DE | 102007045129 A1 † | 4/2009 | |
| DE | 102010052878 A1 | 6/2012 | |
| DE | 202012100364 U1 | 5/2013 | |
| DE | 10 2011 056 420 A1 † | 6/2013 | |
| DE | 102011056420 A1 † | 6/2013 | |
| DE | 202013003693 U1 | 8/2013 | |
| DE | 10 2014 000 076 A1 | 7/2015 | |
| DE | 202017007058 U1 | 6/2019 | |
| GB | 2364930 A | 2/2002 | |
| JP | H05-57063 A | 3/1993 | |
| JP | 2001340663 A | 12/2001 | |
| JP | 2003126539 A | 5/2003 | |
| JP | 2006-116122 A | 5/2006 | |
| JP | 2007-143826 A | 6/2007 | |
| JP | 2007-252791 A | 10/2007 | |
| JP | 2007256754 B2 | 10/2007 | |
| JP | 2014-29712 A | 2/2014 | |
| KR | 100666487 B1 | 2/2006 | |
| WO | 9960583 A1 | 11/1999 | |
| WO | WO-2004108239 A2 * | 12/2004 | A63H 3/28 |
| WO | 2006/048668 A1 | 5/2006 | |
| WO | 2006058204 A2 | 6/2006 | |
| WO | 2008013356 A1 | 1/2008 | |
| WO | 2009/031832 A2 | 3/2009 | |
| WO | 2010125158 A1 | 11/2010 | |
| WO | 2011/093694 A1 | 8/2011 | |
| WO | 2011093694 A1 | 8/2011 | |
| WO | 2012110237 A1 | 8/2012 | |
| WO | 2014127288 A1 | 8/2014 | |
| WO | WO-2014127288 A1 * | 8/2014 | G06F 3/033 |
| WO | 2015104222 A | 7/2015 | |
| WO | 2016/055862 A1 | 4/2016 | |
| WO | 2017/100821 A1 | 6/2017 | |

OTHER PUBLICATIONS

Kloevekorn Sven: NFC Task Launcher: Smartphone automatisieren mit NFC-Tags. https://web.archive.org/web/20131003102200/http://www.androidnext.de/apps/nfc-task-launcher/. Dated Mar. 9, 2013. 5 Pages.

Third Party Observations, notification date to Applicant of Sep. 22, 2017, in related EP Application No. 15701934, with English translation.

International Search Report dated Jun. 23, 2015 for related International Application No. PCT/EP2015/000029.

International Search Report dated Apr. 7, 2017 for related PCT Application No. PCT/EP2017/000046.

International Search Report dated Jul. 27, 2017 for related PCT Application No. PCT/EP2017/000045.

"Bilderbuch-Welt mehr genieften! Sonder-dock fur den 'Miffy-MP3-Spieler' mit La-destation und Laut-sprecher", Gadget Tsushin, Jul. 30, 2010.

Shanghai Donya: "Jener Roboter wurde zu einem Lautsprecher. Verkaufsstart: Robo-terformiger Vibrationsiautsprecher mit von der Stellflache abhangigerTonqualitat und MP3-Spielfunktion", Value Press!, Nov. 19, 2012.

"Wireless Power in Passive RFID Systems" Wu Shen; Bachelor—Arbeit, Mikkeli University of Applied Sciences, May 2010.

"Energy Harvesting Techniques for Autonomous WSNs/RFID with a Focus on RF Energy Harvesting" Ping Zhao; Dissertation, TU Darmstadt, 2012.

Excerpt; "https://de.wikipedia.org/wiki/Sensor" Nov. 13, 2019 English machine translation attached.

Benutzerhandbuch iPod Classic (2009) English machine translation attached.

Excerpt; "https://en.wikipedia.org/wiki/ID3" Nov. 13, 2019.

Excerpt; "https://de.wikipedia.org/wiki/Vorbis_comment#Kapitelmarken" Nov. 13, 2019 English machine translation attached.

Excerpt; Ogg Vorbis Documentation "https://xiph.org/vorbis/doc/v-comment" Nov. 13, 2019.

Ravensburger tiptoi Band 11—Entdecke die Ritter vom 1. Jun. 2012; DPMA Direkt; Sep. 3, 2019 English machine translation attached.

(56) References Cited

OTHER PUBLICATIONS

Vorstellung tiptoi Band 11—Entdecke die Ritter auf "https://ww.youtube.com/ watch?v=6eChjV-jT-Y" DPMA Direkt; Sep. 5, 2019 English machine translation attached.
Bedienungsanleitung "GoGear SA1VBE02/-04-/08/-16" (2009); DPMA Direkt; Sep. 5, 2019 English machine translation attached.
Bedienungsanleitung "cubo Design CD-Radio" (2009) www/sonoro-audio.com; Sep. 2009 English machine translation attached.
Excerpt; http://zenona.com/work/spotify-box/; "Spotify Box"; Jordi Parra; Feb. 2011.
Excerpt; http://awards.ixda.org/entry/2012/spotify-box; Interaction Awards; 2012.
Excerpt; https://blog.zenona.com/; "Apotify Box Worklog"; Jordi Parra; May 25, 2012.
Klaus Finkenzeller; RFID Handbuch; 2002; Hanser; Germany English machine translation attached.
MAC Address Definition; DPMADirekt; Aug. 15, 2019; www.linfo.org/mac_address.htm.
MAC-Adressen—Aufbau, Funkiton ud Gefahren in Metzwerk; May 19, 2019; www.datenschutzbeauftrager-info.de English machine translation attached.
IP-Adresse; Wikipedia; Mar. 24, 2019; https://de.wikipedia.org/wiki/IP-Adresse English machine translation attached.
IPv4; Wikipedia; Aug. 4, 2019; https://de.wikipedia.org/wiki/IPv4 English machine translation attached.
IPv6; Wikipedia; Aug. 5, 2019; https://de.wikipedia.org/wiki/IPv6 English machine translation attached.
Tag (Begriffsklarung); Apr. 29, 2019; https://de.wikipedia.org/wiki/Tag_(Begriffsklarung) English machine translation attached.
RFID; Wikipedia; Jun. 5, 2019; https://de.wikipedia.org/wiki/RFID English machine translation attached.
Wikipedia, Radio-frequency identification (Wikipedia I), web page https://en.wikipedia.org/wiki/Radio-frequency_identification, 28 pages, Dec. 28, 2013; retrieved via Internet /Archive Wayback Machine https://web.archive.org/web/20131228134619/https://en.wikipedia.org/wiki/Radio-frequency_identification on Jan. 14, 2020.
Wikipedia, Transponder (Wikipedia II), Web page https://en.wikipedia.org/wiki/Transponder, 4 pages, Aug. 13, 2013; retrieved via Internet Archive Wayback Machine https://web.archive.org/web/20130813215957/https://en.wikipedia.org/wiki/Transponder on Jan. 14, 2020.
"[W-CDMA / GSM mobile phone of type] D905i with a high-point playback function for an event recorded on video in accordance with 1-SEG", Handy Watch (online), Nov. 1, 2007, searched on Oct. 23, 2019. URL: https://k-tai.watch.impress.co.ip/cda/article/news_toppaqe/36997.html English machine translation of reference is attached.
"Sensor Music Player (free app): If you tap your smartphone on a pocket, a piece jumps to the next piece!", OCTOBA (online), Aug. 9, 2012, searched on Oct. 23, 2019. URL: https://web.archive.org/web/20130116072627/ https://octoba.net/archives/20120809-android-app-sensor-music-15729.html English machine translation of reference attached.
"Report of an event MEG + miuro Premium Showcase at the Apple Store Ginza", ASCII, jp (online), Dec. 4, 2007, searched on Oct. 23, 2019. URL: https://ascii.jp/elem/000/000/089/89974/ English machine translation of reference attached.
Zhang, Wenjun et al., Digital Media Copyright Management, 2014, Fudan University Press Co., Ltd., pp. 160-161.

\* cited by examiner
† cited by third party

TOY

CROSS-REFERENCE TO RELATED APPLICATIONS

This application is a national phase application under 35 U.S.C. § 371 of International Patent Application No. PCT/EP2017/000046 filed Jan. 17, 2017, which claims priority to German Application No. 10 2016 000 630.7 filed Jan. 25, 2016, the entire contents of all of which are incorporated herein by reference for all purposes.

FIELD OF THE INVENTION

The invention relates to a toy for replaying music or a spoken story and a device for replaying audio information and a device for replaying image, video or 3D information and a device for executing software and a system comprising a toy or such a device and an identification carrier and also a method for replaying audio information and a method for replaying image, video or 3D information and a method for executing software and also an identification carrier.

BACKGROUND

From WO 2015/104222 a toy for replaying music or a spoken story is known, having a loudspeaker or a loudspeaker terminal, a sensor which within a region of its surroundings can detect a property or a change in a property of said surroundings, and a control unit that can drive the loudspeaker or the loudspeaker terminal to replay music or a spoken story if the sensor within a region of its surroundings detects a property or a specific change in a property of said surroundings or if the control unit detects a specific change in the property detected by the sensor. It is further known from WO2015/104222 A1 to combine such a toy with an identification carrier to form a system in which the identification carrier has a property that the sensor can detect, or the identification carrier changes a property of the surroundings of the sensor, which the sensor can detect in the region of its surroundings. As the preferred embodiment, it is known from WO 2015/104222 A1 that the identification carrier has an RFID transponder or an antenna and can transmit and/or receive a modulated wave. In addition, it is known from this document that the sensor is a reading device for communicating with a passive RFID transponder and/or for communicating with an active RFID transponder.

In one preferred embodiment, the device according to WO 2015/104222 A1 comprises a unit for receiving data from the Internet and/or for transmitting data into the Internet, particularly preferably an antenna for a wireless local area network (WLAN), a mobile data radio technology such as, for example, LTE, UMTS or the predecessors or successors thereof, or a connection socket for connecting a cable of a local area network that also has an Internet access, for example a connection socket for an Ethernet cable. Owing to the presence of a unit for receiving data from the Internet, there is the possibility of the control unit downloading from the Internet the data containing the audio information to be replayed in a specific data format. In this way, the device can replay audio information that was not stored in the device before the sensor detects within the region of its surroundings a specific property or a specific change in a property of said surroundings or the control unit detects a specific change in the property detected by the sensor. In this case, the control unit may be designed in such a way that it receives the data from the Internet and permanently stores them in a memory and the driving of the loudspeaker for replaying the audio information is performed on the basis of the data stored in the memory. Supplementarily or alternatively, it is possible for the control unit to directly use the data received from the Internet in order to drive the loudspeaker for replaying audio information (so-called streaming), wherein this embodiment may also encompass the temporary buffer-storage of the data received from the Internet in a buffer memory.

In embodiments that receive from the Internet the data containing the items of audio information in a specific data format, for example, in the device known from wo2015/104222 A1, it is possible for the control unit to make available in a memory a specific server address of a server connected to the Internet and to make available in a memory a table in which a respective specific property or a respective specific change in a property is assigned to a respective identification number. In such an embodiment, the control unit is then designed, upon recognizing the specific property or the specific change in the property, to communicate with the concrete server and, having recourse to the identification number assigned to the specific property or the specific change in the property, to download from the server a specific data set and to use it for driving the loudspeaker for replaying the audio information resulting from said data. By way of example, music tracks may be stored as data in a specific data format on the server, wherein the respective music track, or the data containing said music track, is or are stored under a specific identification code on the server. In one preferred embodiment, the device according to the invention already contains an assignment table that assigns specific properties or changes in the properties of the region of the surroundings of the sensor to some, a plurality or, in one preferred embodiment, even all of the identification numbers that are also used on the database of the server. This enables the control unit to download data sets from the server in a targeted manner. Alternatively, it is possible for the control unit to be designed to communicate information containing the detected specific property, or information containing the detected specific change in the property, to a specific server that is connected to the Internet. The assignment of the recognized specific property or of the recognized specific change in the property to specific audio information can then be performed on the server. The control unit is then designed to receive from the server data containing the audio information to be replayed. The server communicates to the device according to the invention the data which it has assigned to the specific property communicated by the control unit or to the specific change in the property communicated by the control unit. This embodiment avoids the need for making available an assignment table in the device according to the invention and thus increases the flexibility of the reception of specific data containing the audio information on the basis of a specific detected property or a specific detected change in a property of the region of the surroundings of the sensor. Such an embodiment makes it possible for example to increase the number of data sets provided on the server, without the need to adapt an assignment table in the control unit of the device according to the invention.

SUMMARY

Against this background, the invention was based on the object of proposing a method and a system which, starting from the toy known from WO 2015/104222 A1, or starting from the device known from WO 2015/104222 A1, or starting from the method WO 2015/104222 A1, increases the scope of their possible applications.

This object is achieved by a toy disclosed herein, a device disclosed herein, a system disclosed herein, and a method disclosed herein. Advantageous embodiments are presented in the description below.

According to a first aspect, the invention proceeds from the basic concept of equipping the toy or the device with a device identification and providing a mechanism for sending a signal that is dependent on the device identification. A device identification can be the identification of a processor or a memory chip. The device identification can also be an identification provided separate from a processor or a memory chip, for example a tag, such as an RFID transponder, which is provided as part of the toy, or of the device. In a preferred embodiment, the device identification is selected such that it is suitable for clearly identifying the toy or the device vis-à-vis an external control unit.

The mechanism for transmitting a signal dependent on the device identification can transmit a cable-connected signal, for example if the toy or the device is connected with an external control unit over a cable. However, the mechanism for transmitting a signal dependent on the device identification can also transmit a radio signal, such as a signal according to an NFC standard, a Bluetooth standard or a WLAN standard, for example if the toy or the device is connected into a radio network.

The provision of a device identification and the possibility of transmitting a signal dependent upon the device identification, for example to an external control unit, makes it possible to make further data communication between the toy or the device and an external control unit and/or an external memory dependent upon the presence of a pre-established authorization. In the following, embodiments of the invention will be described in which the toy or the device is used to replay content (especially audiobooks, music or other audio information, images, video or 3D information) and/or to execute software, but wherein before replaying or execution takes place, at least one data packet is transferred from an external memory to a memory in the toy or the device. This data packet—depending on the data system selected, or depending on the data structure selected—may contain all or part of the content to be replayed or executed. The provision of a device identification and the possibility of transmitting a signal dependent upon the device identification can now be used to make a command to transmit a data packet dependent upon the fact that an authorization check shows that a toy or the device with such a device identification is entitled to receive the data packet.

Such identification of the toy, or of the device in a network or in a system can be used to bill the transmission of data packets to the device or the toy to a user of the device or toy. For example, the transmission of individual data packets, such as the transmission of the data packets needed for replaying an audiobook, can be billed individually. Flat-rate charging systems are also possible. Also coupling the possibility of downloading such data packets to a time or a time period, for example in the sense of "borrowing an audiobook."

Such identification of the toy, or of the device in a network or in a system can also be used to transmit control information relating to the operation of the toy, or of the device, which is held as a data packet in an external memory, until the toy or the device registers with the appropriate device identification in the system, to exactly this toy or this device. If a toy or the device of this type, for example, is integrated in a system intended to make it possible for third parties, for example parents, to limit the time of using the toy or the device or the maximum volume of the replaying of audio information via a program on a Smartphone or a tablet of the third party, an embodiment is possible in which the limitations generated on the Smartphone or tablet are stored as a data packet in an external memory or in an external control unit, for example a Cloud. Using the device identification it is possible for the third party to report to the external memory or the external control unit the toy or the device for which the data packet is intended. When the toy or the device registers with this device identification, the data packet is then transmitted to the toy or the device.

In one preferred embodiment, the system according to the invention provides an external memory, from which a data packet can be transmitted to a memory in the toy or the device and/or to which a data packet can be transmitted by the toy or the device if the sensor within the region of its surroundings detects a specific property or a specific change in a property in these surroundings or if the control unit detects a specific change in the property detected by the sensor. For example, an external memory of this type can be a "cloud." The external memory can preferably be designed such that it transmits data packets only after authorization, for which preferably handshake methods, encryption methods, private or public keys or a combination of a selection of these techniques is used. The device identification may also be used for checking authorization.

In one preferred embodiment, the system according to the invention provides an external control unit, to which a data packet can be transmitted by the toy or the device if the sensor within the region of its surroundings detects a specific property or a specific change in a property in these surroundings or if the control unit detects a specific change in the property detected by the sensor. An external control unit of this type may be, for example, a server. This server can be part of a local area network or part of the Internet.

The methods according to the invention provide that a data packet will be transmitted by the toy or the device if the sensor within the region of its surroundings detects a specific property or a specific change in a property in these surroundings or if the control unit detects a specific change in the property detected by the sensor.

This insight can be used, for example, to reduce the communication times between the toy and the device and an external memory. For example, it can be provided that if no communication connection initially exists between the toy or the device and the external memory or the external control unit, if the sensor within the region of its surroundings detects a specific property or a specific change in a property in these surroundings or if the control unit detects a specific change in the property detected by the sensor, the fact that the sensor within the region of its surroundings detects a specific property or a specific change in a property in these surroundings or the fact that the control unit detects a specific change in the property detected by the sensor is utilized as the triggering event for the formation of a communication channel between the toy or the device and the external memory or the external control unit.

In particular, a procedure of this type also makes it possible to close an existing communication channel again when a specific event occurs. For example, if the communication channel is established wirelessly, the radio connection can be broken when a specific event is reached. In this way it is possible to reduce the radiation to which a user of the toy, or of the device is exposed. The triggering event can, for example, be the removal of an identifier from the toy or the device. Likewise the triggering event can be the elapsing of a previously established time interval (also after removal of an identifier). With these measures a good balance can be found between maximum operating convenience, which is most likely to exist with a permanently existing channel between the external memory or the external control unit and the toy or the device, and the desire to reduce the radiation load.

The external memory can be provided in an external computer, with which the toy or the device can be connected via a cable or a radio connection. A computer of this type may be present locally, for example on a home network, in which the toy or the device is also located. However, the external memory may also be a memory with which the toy or the device makes contact over the Internet, for example a memory in a so-called "cloud."

To achieve the benefits of the invention it is not necessary for a data packet always to be transmitted from an external memory to a memory of the toy if the sensor within the region of its surroundings detects a specific property or a specific change in a property in these surroundings or if the control unit detects a specific change in the property detected by the sensor. For example, in one preferred embodiment of the method it is possible that the toy or the device has a memory in which data packets can be stored and a control unit of the toy, or of the device knows which data packets are stored in the memory of the toy, or of the device. In this preferred embodiment of the method, a data packet is only transmitted by an external memory to a memory of the toy if the sensor the sensor within the region of its surroundings detects a specific property or a specific change in a property in these surroundings or if the control unit detects a specific change in the property detected by the sensor, if the control unit detects that the data packet to be transmitted from the external memory to a memory of the toy is not already stored in the memory of the toy. In this way the volume of data exchanged between the external memory and the memory of the toy, or of the device can be reduced.

Embodiments are possible in which the external memory makes available data packets which in any case are to be transmitted from the external memory to a memory of the toy, or of the device if the sensor within the region of its surroundings detects a specific property or a specific change in a property in these surroundings or if the control unit detects a specific change in the property detected by the sensor. Such data packets can, for example, be software updates for the software used by the control unit. Such data packets can also be control data packets. With such control data packets it is possible, for example, to establish a maximum volume at which the toy or the device replays audio information through a loudspeaker or a loudspeaker connection. In one preferred embodiment, a control data packet of this type can control the manner of functioning of the control unit of the toy, or of the device. For example, by means of the data packet it is possible to determine how long the control unit will replay audio information or image, video or 3D information or execute software. In this manner, chronological limitation of use can be performed. Furthermore with the control data the replaying of specific audio information or specific image, video or 3D information, or specific software can be blocked. This blocking can be performed in general, so that the respective content cannot be replayed at all, for example to maintain age limits. However, such blocking may also be temporary, for example in order to prevent only one item of content always being replayed over a specific time period.

In one preferred embodiment it is provided that a data packet from the player of the toy, or of the device is transmitted to the external memory if the sensor within the region of its surroundings detects a specific property or a specific change in a property in these surroundings or if the control unit detects a specific change in the property detected by the sensor. For example, it is possible for the control unit of the toy, or of the device to maintain statistics on the utilization thereof, thus especially on the replayed audio information or the replayed image, video or 3D information, or on the software executed, for example how frequently the respective content was replayed or executed. If the content of such statistics is transmitted to the external memory, for example parents who have access to data from the external memory can determine which content was used how frequently by their children, how long any content at all was retrieved, and other statistical information, for example the software status of the control unit or the charging status of a battery of the toy, or of the device.

The data packet that is transmitted from an external memory to the memory of the toy, or of the device can come from a library of databases made available in the external memory. This library can be furnished by an external service provider, for example by audiobook providers or film distributors. However, embodiments are also possible in which the data packet in the external memory can be a data packet individually recorded using recording software. The recording software can be executed by a processor that is part of the computer to which the external memory belongs. Solutions of this type are available for home networks. However, the recording software can also be executed on an external computer, for example on a Smartphone, a tablet computer, a laptop, a desktop computer or a workstation, and the data packet generated in this way placed over the Internet in the external computer, for example a "Cloud," from which it is transmitted to the memory of the toy, or of the device. This makes it possible for a third party to record speaker's notes, images or film sequences, for example stories, and make them available in the external memory. The corresponding data packet can be transmitted from the external memory to a memory of the device if the sensor within the region of its surroundings detects a specific property or a specific change in a property in these surroundings or if the control unit detects a specific change in the property detected by the sensor. The external memory can be designed to replace an existing image with a new image. When the toy or the device requests data packages from the external memory, the external memory and the device can be designed such that first a check is made to see whether a copy of the data packet is already stored in the toy or the device. This check can be performed by the toy or the device, or preferably by the external memory. Depending on this it is possible to decide, for example, whether and which data packets will be transmitted from the external memory to the toy or the device. In this way, different content can be retrieved over time, for example, primarily content that changes regularly over time (e.g., so-called podcasts) or content that changes depending on events. In such an embodiment, the toy or the device can be designed to check automatically at predetermined times whether the content assigned to a specific identification has changed, and preferably also automatically store the new content so that it will be available more quickly upon the next recognition of the identification. For this purpose the toy or the device transmits to the external memory a notification that the command is taking place automatically. Thus the external memory can process this command differently from other commands, for example with regard to the priority of data transmission.

In the context of the following embodiment, described in further detail, in which the sensor within the region of its surroundings detects a specific property or a specific change in a property in these surroundings or if the control unit detects a specific change in a property detected by the sensor, when an identification located in a figurative corpus is brought into the surroundings of the sensor, various strategies are now available, which may in particular be linked with the shape of the figure. For example, the figure may be the shape of the main character in a specific story. If this figure, with its identification, is brought into the region of the sensor, and if within the region of the surroundings thereof a specific property associated with this figure or a specific change in a property of these surroundings associated with this figure is detected or if the control unit detects a specific change, associated with this figure, in the property detected by the sensor, a data packet can be loaded from the external memory into the memory of the device or the toy, which is in the context of this main figure. In this way, for example, audio plays for children can be downloaded. However, this embodiment also offers the opportunity to choose figurative forms for the identification that are not assigned to any main character in a known story, so-called fantasy identifications. Fantasy identifications may also, for example, be based on objects or persons, and more preferably may be either mass-produced or individually produced, for example by 3D printing techniques. If the sensor within the region of its surroundings detects a specific property assigned to this fantasy identification or a specific change in a property in these surroundings assigned to the fantasy identification, or if the control unit detects a specific change, assigned to this fantasy identification, in the property detected by the sensor, this can bring about the transfer of a data packet from the external memory to a memory of the device, which data packet was first recorded by recording software. In this way, for example, the possibility arises that parents or grandparents can tell stories to their children or grandchildren or record bedtime stories that the children can listen to or—in the case of a video or 3D recording, can watch when they place the fantasy identification in the surroundings of the sensor.

To transmit a packet to the external memory, recording software may be used, which can record content or otherwise imported content, all or part of which content can be transmitted to an external memory over a network, and can assign the content to one or more specific identification(s) or group(s) of identifications. For this purpose, the recording software identifies—once or repeatedly—over a connection to the toy or the device (either directly or over a server connected as an intermediate) one or more specific identification(s) or groups(s) of identifications that come under consideration for the assignment, and allows the user to of the recording software to determine before or after the recording or the importing, which identification(s) should be assigned. This can preferably take place in that—if the user has the identification for the reporting software—the identification is placed in the recognition area of the toy, or of the device. However, it can also take place in that a relationship between the user of the recording software (or a user group) and one or more identification(s) is stored, for example in the form of a user account. It can also take place in that a relationship between a user account of the user and a device identification is stored, and the identification(s) are assigned to the device identification. The assignment to the user account may preferably also be accomplished in that individual information that is associated with the identification but can be transported separately from it, used in the recording software or different software, can perform the assignment to the user account. The individual information may be, for example, an alphanumeric code, a bar code or a QR code. The assignment possibilities mentioned can preferably be combined to achieve greater convenience for the user of the recording software. The assignments to a user account are, for example, stored in an external memory or in the same device as the recording software, preferably at both locations. In particular, recording software can be designed such that it allows assignment to this identification even without physical access to a specific identification.

The recording software and the external memory can also be designed such that the recording software can transmit the desired limitations of authorization for specific identifications or groups of identifications to the external memory, especially for fantasy identifications. These limitations can be transmitted by the above-described control packets to a toy or a device. However, they can also (for example, additionally) be considered in an authorization check prior to transmission of data packets by the external memory.

Preferably, in order to achieve greater convenience, at the same time the recording software also offers the previously described possibilities for generating additional control data packets, for example for limiting the sound volume.

It is also possible to transmit data packets continuously, and particularly preferably continuously over a specific time period, from the external memory to the device memory, or to stream them. For example, data packets for radio transmission or for television viewing or for replaying films can be transmitted in this way from an external memory to a memory of the device or the toy.

The invention proceeds from the basic concept of using as part of the toy, or of the device, a sensor that can detect within a region of its surroundings a property or a change in a property of said surroundings, and also of providing a control unit that can perform the desired driving if the sensor detects within the region of its surroundings a specific property or a specific change in a property of said surroundings. A device comprising said sensor and said control unit and also a method that uses such a sensor and such a control unit lead to particularly simple operation. For replaying the desired information, or for executing the software, it may suffice according to the invention to impart to the surroundings a specific property detectable by the sensor, or to carry out a change—detectable by the sensor—in the property of said surroundings and thus—in one particularly preferred embodiment of the invention—to bring about directly the replay of the desired information, or the execution of the software.

The simplified operating concept provided by the invention can be implemented particularly well in a toy for replaying music or a spoken story. However, it has been found that the simplified operating concept also affords advantages generally in a device for replaying audio information and even also in a device for replaying image, video or 3D information or a device for executing software. The following description—unless explicitly describing the special features of the replay of image, video or 3D information or of the execution of software or explicitly describing special features that are relevant only to the replay of audio information—describes the invention on the basis of the preferred area of use of replaying audio information in a manner representative of the further areas of use of use as a toy, replaying image, video or 3D information or executing software. For the area of use of replaying image, video or 3D information, in so far as the following description describes the driving of the loudspeaker or of the loudspeaker connection, this is also taken to mean the driving of the display or of the connection for the display for replaying image, video or 3D information. For the area of use of executing software, in so far as the following description describes the driving of the loudspeaker or of the loudspeaker connection, this is also taken to mean the driving of the processor for executing the software. The toy constitutes one preferred embodiment of a device for replaying audio information which in particular is concretized by the fact that the audio information to be replayed is music or a spoken story.

The device according to the invention and the method according to the invention can be used—comparably to an MP3 player of the conventional type—for replaying audio information based on information stored on the MP3 player. The use of CDs is avoided as a result. At the same time, the invention simplifies the operating concept of the conventional MP3 players. In one preferred embodiment of the invention, just setting a specific property, or a specific change in a property of the surroundings of the sensor can lead to the immediate replay of the audio information. The operating concept that is often laborious particularly for children in the case of conventional MP3 players is obviated as a result. As a result, the device according to the invention and the method according to the invention are particularly well suited to use in children's toys. However, the simplified operating concept also affords the possibility of replaying audio information for adults in a particularly simple manner.

One area of use of the invention is the replay of audio information, in particular of pieces of music, spoken texts or the combination of pieces of music and spoken texts. Said audio information has particularly preferably a replay duration of at least 10 s, with preference of more than 15 s, particularly preferably of more than 20 s, and especially preferably of more than 25 s. In one particularly preferred embodiment it is even provided that the replay duration of the audio information may last at least 30 s and particularly preferably more than 1 min. By way of example, radio plays, which are intended particularly preferably to be replayed by means of the invention, often have a length of more than 5 min, in some instances also of up to 30 min or even more. The audio information to be replayed according to the invention is, in particular, not a confirmation signal. In particular, the audio information to be replayed according to the invention is not an acknowledgement sound that may be output, for example, if a first object has been aligned correctly relative to a second object. Likewise, the audio information is particularly preferably not a jingle played if a first object is brought into the vicinity of a second object or is brought into a previously defined, specific position relative to the second object. The invention is concerned with the audio information whose replay duration lasts for a relatively long time, as is the case for pieces of music or spoken texts. The audio information is particularly preferably such audio information whose replay involves replaying a non-periodic sequence of different sounds.

The loudspeaker of the device according to the invention is particularly preferably a transducer that can convert electrical signals into mechanical oscillations (sound).

The device according to the invention may also comprise instead of a loudspeaker a loudspeaker connection, for example a Speakon, XLR connection or a 6.35 mm jack socket, for example. By virtue of the fact that the control unit drives the loudspeaker connection, in the event of a loudspeaker being connected to the loudspeaker connection said control unit can also drive said loudspeaker. The loudspeaker connection may also be a transmitting unit that can communicate with a loudspeaker via radio, for example, via Bluetooth or via a WLAN radio network. Particularly preferably, however, the transmitting unit does not communicate with the loudspeaker by means of a WLAN radio network, but rather via Bluetooth, for example. Likewise, the device may comprise, as loudspeaker connection or as connection for the display for replaying image, video or 3D information, a connection compatible with a docking station of a smartphone. Docking stations for smartphones can be used to drive a loudspeaker or a display for replaying image, video or 3D information on the basis of drive commands of the smartphone. By virtue of the fact that the device according to the invention comprises a connection compatible with such a docking station and is connected to the docking station instead of the smartphone, the control unit of the device according to the invention acquires the possibility of driving the loudspeaker connected to the docking station or the display—connected to the docking station—for replaying image, video or 3D information. The docking station can be connected to the loudspeaker or the display for replaying image, video or 3D information by means of cables. However, the docking station can also be connected to the loudspeaker or the display for replaying image, video or 3D information wirelessly, for example via a radio network. The following description—unless explicitly describing the special features of the driving of a loudspeaker connection or of a connection for a display for replaying image, video or 3D information—describes the invention on the basis of the preferred area of use of the driving of a loudspeaker in a manner representative of the further possibilities of the driving of a loudspeaker connection or of a connection for a display for replaying image, video or 3D information. For the area of use of the driving of a loudspeaker connection or of a connection for a display for replaying image, video or 3D information, in so far as the following description describes driving the loudspeaker or a display for replaying image, video or 3D information, this is also taken to mean driving a loudspeaker connection or a connection for a display for replaying image, video or 3D information.

In one preferred embodiment, the device according to the invention comprises at least two loudspeakers, such that a replay of the audio information in stereo becomes possible.

In the case of the device according to the invention, it is possible to use a sensor that can detect a property within a region of its surroundings. It is likewise possible to use a sensor that can detect within a region of its surroundings a change in a property of said surroundings. It is likewise possible to use a sensor that both can detect a property within a region of its surroundings and can detect within a region of its surroundings a change in a property of said surroundings.

In one preferred embodiment, the sensor can detect for example the strength of a magnetic field in a specific region of its surroundings; the sensor can generate a signal dependent on the strength of said magnetic field, said signal being fed to the control unit. If the control unit recognizes that the signal attains a specific, predefined value, then the control unit recognizes that the sensor detected within the region of its surroundings a specific property, namely a specific strength of a magnetic field. The control unit can thereupon drive the loudspeaker for replaying audio information.

In a supplementary or alternative exemplary embodiment, the sensor can detect the change in the strength of the magnetic field within a region of its surroundings and for example generate a signal that is fed to the control unit, said signal being dependent on the rate of change of the magnetic field strength or the direction of the magnetic field strength (is the magnetic field becoming stronger or weaker?). If the control unit to which the signal is fed recognizes that the change attains a specific value, then the control unit can drive the loudspeaker for replaying the audio information.

In a supplementary or alternative embodiment, the sensor can detect that a magnetic field in a specific region of its surroundings has a specific field direction relative to a preferred direction. Particularly preferably, the sensor can detect that the magnetic field does not have the preferred direction. With particular preference, the sensor can even detect the angle of the field direction of the magnetic field relative to a preferred direction. In this embodiment, the sensor can convey to the control unit by means of a signal the fact that the field direction of the magnetic field does not correspond to the preferred direction. Just on the basis of this signal, the control unit can drive the loudspeaker for replaying the audio information. In an alternative embodiment, the sensor can even convey to the control unit by means of a signal the angle of the field direction of the magnetic field in relation to the preferred direction. It is then possible to stipulate that the control unit drives the loudspeaker for replaying audio information if the field direction of the magnetic field is at a specific angle relative to the preferred direction.

Exemplary embodiments are likewise conceivable in which the control unit evaluates a signal of the sensor that is dependent on the angle of the field direction of the magnetic field relative to the preferred direction, and drives the loudspeaker for replaying the audio information if the field direction of the magnetic field changes in a specific manner relative to the preferred direction, for example changes in a specific direction relative to the preferred direction or changes for example at a specific rate relative to the preferred direction, or alternatively has a change profile relative to the preferred direction over a predetermined time period, wherein change profile is understood to mean, in particular, a temporal succession of different angles assumed by the field direction of the magnetic field relative to the preferred direction.

The property—to be detected by the sensor—of a region of its surroundings is also understood to mean according to the invention the presence of an electromagnetic wave, preferably temporally invariant with regard to its properties, in the region of the surroundings of the sensor or the presence of a metallic structure, for example, which influences an electromagnetic wave present. Exemplary embodiments are conceivable in which the sensor is configured in such a way that it can detect the presence of a specific electromagnetic wave, for example can recognize the presence of an electromagnetic wave having a specific velocity, specific intensity, a specific wave impedance, a specific wavelength and/or a specific frequency. The sensor may also be configured such that it can detect a structure that can influence a specific electromagnetic wave, for example an electromagnetic wave having a specific velocity, specific intensity, a specific wave impedance, a specific wavelength and/or a specific frequency. If the sensor recognizes such an electromagnetic wave or such a structure, it can convey this to the control unit by means of a signal. Supplementarily or alternatively, the sensor may be designed in such a way that it can measure the velocity, the intensity, the wave impedance, the wavelength and/or the frequency and can convey the respective value of the recognized variable and/or the change in the respectively recognized variable to the control unit by means of a signal. The electromagnetic wave recognized by the sensor is particularly preferably not an electromagnetic wave having a wavelength or frequency in the spectrum visible to the human eye and/or from the infrared spectrum. Particularly preferably, the influencing by a structure as recognized by the sensor does not concern an electromagnetic wave having a wavelength or frequency in the spectrum visible to the human eye and/or from the infrared spectrum. The electromagnetic wave recognized by the sensor is particularly preferably not an electromagnetic wave of a WLAN radio network, in particular not a wave of a radio network according to a standard in the IEEE 802.11 family. Particularly preferably, the influencing by a structure as recognized by the sensor does not concern an electromagnetic wave of a WLAN radio network, in particular not a wave of a radio network according to a standard in the IEEE 802.11 family.

The change—to be detected by the sensor—in a property of a region of its surroundings is particularly preferably understood to mean the change in a property of an electromagnetic wave. While the preceding section described the presence of a specific electromagnetic wave, preferably temporally invariant with regard to its properties, as the property—to be detected by the sensor—of the region of its surroundings, the text below describes the possibility that an existing electromagnetic wave can be adapted and as a result a change—to be detected by the sensor—in a property of a region of its surroundings is generated on the basis of which the control unit can drive the loudspeaker for replaying the audio information. An electromagnetic wave can be generated for example by a reader for communicating with a passive RFID transponder and be changed by virtue of the passive RFID transponder being brought into a region of the surroundings of the reader in which its presence changes the electromagnetic wave. The change in the electromagnetic wave that is brought about by the introduction of the RFID transponder can be recognized by the sensor as a change in a property of a region of its surroundings. The possibility of recognizing changes in an electromagnetic wave makes it possible for the invention to bring about the specific change—necessary for driving the loudspeaker—in a property of the region of the surroundings of the sensor by means of a radio signal or a modulated wave. Particularly preferably, the electromagnetic wave whose change is recognized is not an electromagnetic wave of a WLAN radio network, in particular not a wave of a radio network according to a standard in the IEEE 802.11 family.

In one preferred embodiment, the sensor detects a property within a region of its surroundings or a change in a property within a region of its surroundings without direct electrical contact with a component bringing about the property or the change. In a supplementary or alternative embodiment, the sensor detects a property within a region of its surroundings or a change in a property within a region of its surroundings without direct mechanical contact with a component bringing about the property or the change. For the device according to the invention this affords the advantage that the audio information can already be replayed if the operator only sets the property in the relatively close surroundings of the device in a predetermined manner or changes it in a predetermined manner. This obviates the need, for the purpose of replaying the audio information, to bring an object into contact in a specific manner with the device according to the invention for replaying the audio information, for example to introduce a key element into a receptacle provided in the device or to plug for example a USB memory stick into a USB receiving socket in a manner known from the prior art. In particular an antenna, an inductive sensor, a magnetic field sensor or a temperature sensor that can detect radiation in the infrared spectrum are suitable for contactlessly detecting a property of a region of the surroundings of the sensor, or for contactlessly detecting a change in a property of a region of the surroundings of the sensor. However, it is also conceivable for the sensor to be a capacitive sensor, a piezoelectric sensor, an ultrasonic transducer or electrochemical sensor.

In an alternative embodiment, the sensor is not embodied as a temperature sensor that can detect radiation in the infrared spectrum. In an alternative embodiment, the sensor is not embodied as an antenna. In an alternative embodiment, the sensor is not embodied as a capacitive sensor. In an alternative embodiment, the sensor is not embodied as a piezoelectric sensor. In an alternative embodiment, the sensor is not embodied as an ultrasonic transducer. In an alternative embodiment, the sensor is not embodied as an electrochemical sensor. In an alternative embodiment, the sensor is not embodied as an optoelectronic sensor.

The device according to the invention and the method according to the invention, in terms of their operating concept, may be based on the fact that the sensor detects a specific, concrete property or a specific change in said property, or may be based on the fact that the control unit recognizes, from the measurement signal fed to it by the sensor, that within the region of the surroundings of the sensor a specific property is present or a specific change in a property is present. By way of example, the device according to the invention and the method according to the invention may be based on the fact that a magnetic field in the region of the surroundings of the sensor has a specific absolute value of the magnetic field strength or the field direction of the magnetic field has a specific angle with respect to a preferred direction. Since, in one preferred embodiment, however, the device according to the invention and the method according to the invention are intended to be used to replay a multiplicity of different items of audio information and the choice of the audio information to be replayed is intended to be dependent on the presence of a respective concrete property or a respective concrete change in the property in the region of the surroundings of the sensor, in this embodiment there is the restriction that only a limited number of items of audio information can be replayed. If the device according to the invention is embodied for example such that a first piece of music is replayed if the strength of the magnetic field in the region of the surroundings of the sensor assumes a first value and a second piece of music is replayed if the magnetic field in the region of the surroundings of the sensor has a second strength, then the number of items of audio information that can be replayed by the device depends on what maximum and what minimum field strength values the sensor can detect and how fine are the increments that can be detected by the sensor. The property of the surroundings or the change in the property of the surroundings is therefore also understood in particular to mean a modulated wave, in particular an electromagnetic wave, in particular an electromagnetic wave in the radio-frequency range, but particularly preferably not an electromagnetic wave of a WLAN radio network, in particular not a wave of a radio network according to a standard in the IEEE 802.11 family. As a result, for the device according to the invention there is the possibility of detecting the presence of a passive RFID transponder in a specific region of the surroundings of the sensor and of performing the replay of the audio information for example if an RFID transponder is actually present at all in the region of the surroundings of the sensor, or of performing a replay of the audio information if a specific RFID transponder is detected in the region of the surroundings of the sensor. Likewise, in one preferred embodiment, it is provided that the property to be detected by the sensor in the region of its surroundings or the change—to be detected by the sensor—in the property of the region of its surroundings is brought about by an active RFID transponder. It is likewise conceivable for the presence of an electromagnetic wave according to the Bluetooth standard or the presence of an electromagnetic wave according to the near field communication standard (NFC) to be detected as the property. It is likewise conceivable for the change to be detected in the property of the region of the surroundings of the sensor to be provided by an electromagnetic wave according to the Bluetooth standard or according to the NFC standard and to be detected by the sensor. In one preferred embodiment, however, the sensor is designed such that it cannot detect the presence of an electromagnetic wave according to the Bluetooth standard or the presence of an electromagnetic wave according to the near field communication standard (NFC) and/or that it cannot detect the change in an electromagnetic wave according to the Bluetooth standard or according to the NFC standard.

Particularly preferably, an identification is communicated via the electromagnetic wave, with which identification the control unit can identify a data set stored in a memory of the device according to the invention or on a server and, on the basis of the data set, can drive the loudspeaker for replaying the audio information. Particularly preferably, the electromagnetic wave communicates no data that can be converted by the control unit into a customary audio format suitable for driving the loudspeaker, for example MPEG 3 or WAV. In the preferred embodiment, the aim is for the electromagnetic wave to make a data set identifiable, for example by transmitting an identification, but not itself to transmit the data set. In an alternative embodiment, the electromagnetic wave transmits the entire data of the audio information. As a result, the device can replay audio information that was not stored before the corresponding detection by the sensor in the device. Alternatively, the electromagnetic wave transmits a portion of the data, for example the data required for the replay of the first seconds or minutes of the audio information, while the data required for the replay of the further audio information are stored in a memory of the device according to the invention or on a server and can be identified by means of an identification. In one preferred embodiment of this alternative embodiment, however, the electromagnetic wave transmits only the portion of the data required for the replay of the first minute, particularly preferably the first 30 s, particularly preferably the first 10 s, of the audio information, while the data required for the replay of the further audio information are stored in a memory of the device according to the invention or on a server and can be identified by means of an identification.

In one preferred embodiment, the sensor is therefore a reader for communicating with a passive RFID transponder and/or for communicating with an active RFID transponder. In an alternative embodiment, the sensor has an antenna that can emit and/or receive a modulated wave, in particular a wave according to the Bluetooth or NFC standard.

The device may comprise a support on which an article can be permanently positioned, wherein the sensor can detect at least in a region above the support a property or a change in a property of said region, and/or a securing means on which an article can be permanently secured, wherein the sensor can detect at least in a region adjacent to the securing means a property or a change in a property of said region. In this regard, an article, for example an identification carrier described in greater detail below, can be positioned such that it is situated in the detection region of the sensor in which the sensor can detect a property or a change in a property of said region. This has the advantage that the article can remain in the detection region, without the article or the device having to be permanently held fixedly by a user. The securing means may be embodied for example by a hanging, clicking, magnetic, rotary mechanism or in some other way.

The control unit of the device according to the invention can drive the loudspeaker for replaying the audio information if the sensor detects within the region of its surroundings a specific property or a specific change in a property of said surroundings or the control unit detects a specific change in the property detected by the sensor. In one preferred embodiment, the sensor generates a signal having a value detectable by the control unit if the sensor detects within the region of its surroundings a specific property or a specific change in a property. It is also conceivable, for example, for the sensor to generate a signal that is fed to the control unit only if the sensor detects within the region of its surroundings a specific property or a specific change in a property of said surroundings. Such embodiments have the effect that the sensor already performs the evaluation and either feeds a signal to the control unit only if it detects a specific property or a specific change in a property of the surroundings, or else feeds to the control unit a permanent signal having a specific value, which signal is changed to a specific other value detectable by the control unit if the sensor detects within the region of its surroundings a specific property or a specific change in a property of said surroundings. Supplementarily or alternatively, it is conceivable for the control unit to perform the evaluation. In such an embodiment, the sensor permanently feeds a measurement signal to the control unit. The control unit is designed, for example by virtue of the storage of a table of values, to recognize from the measurement signal fed to it by the sensor whether a specific property or a specific change in a property is present within the region of the surroundings of the sensor. In this case, the change in the property of the surroundings of the sensor is understood to mean not only the single occurrence of a specific change, for example the single occurrence of a change in the field direction of the magnetic field in the surroundings of the sensor in a specific direction, but also a temporal succession of properties in the region of the surroundings of the sensor, or a specific succession of changes in the properties of the surroundings of the sensor, for example as is the case when reading out modulated waves or when evaluating electromagnetic waves.

In one preferred embodiment, the control unit drives the loudspeaker for replaying the audio information only if the sensor detects within the region of its surroundings a specific change in a property of said surroundings in the form of a specific succession of changes in the properties, or if the control unit detects a specific change in the property detected by the sensor in the form of a specific succession of changes in the properties. Said succession of changes may be configured in the manner of a character string (a string). Said character string (said string) may contain for example at one specific place the information about the audio information to be replayed and at another specific place an identification word that can function as copy protection or for authentication. If the succession of changes in the manner of the character string does indeed contain the information about the audio information to be replayed, but not the identification word, the control unit does not drive the loudspeaker. As an alternative to the identification word, the character string may also be an instruction sequence of a program (of software) that is executable by the control device for verification purposes.

In one embodiment, the control unit, in addition to the driving of the loudspeaker for replaying the audio information, can also change the type of replay of the audio information, for example the volume of the replay, if the sensor detects within the region of its surroundings a specific property or a specific change in a property of said surroundings or if the control unit detects a specific change in the property detected by the sensor. In this regard, the control unit can drive the loudspeaker depending on said angle at which an identification carrier is situated relative to the sensor. By way of example, the replay volume can be adapted by a variation of the angle.

In one preferred embodiment, the device comprises a memory in which data are stored on the basis of which the control unit can drive the loudspeaker for replaying the audio information. The data particularly preferably include the audio information in the specific data format, for example an MP3 format or a WAV format. Embodiments are conceivable in which the memory only has data of a single item of audio information. In such an embodiment, the device according to the invention can be used, given corresponding setting of the property of the region of the surroundings of the sensor, or given corresponding setting of the change in the property of the region of the surroundings of the sensor, to replay a single item of audio information whose replay duration lasts particularly preferably at least 10 s. In one preferred embodiment, data of different items of audio information are stored in the memory. Particularly preferably, in such an embodiment, the control unit is configured in such a way that, if the sensor detects within the region of its surroundings a specific first property or a specific first change in a property of said surroundings or the control unit detects a specific first change in the property detected by the sensor, said control unit drives the loudspeaker for replaying a first item of audio information whose replay lasts particularly preferably at least 10 s, while the control unit drives the loudspeaker for replaying a second item of audio information whose replay particularly preferably lasts at least 10 s, if the sensor detects within the region of its surroundings a specific second property or a specific second change in a property of said surroundings or the control unit detects a specific second change in the property detected by the sensor. As a result it becomes possible, by means of the specific influencing of the property of the region of the surroundings of the sensor or by means of a specific influencing of the change in the property of said surroundings of the sensor, to stipulate which audio information from a plurality of items of audio information is replayed by the device. By way of example, the device can replay a specific first item of audio information if the presence of a first RFID transponder in the region of the surroundings of the sensor is detected, while the device can replay a second item of audio information if the presence of a second RFID transponder in the region of the surroundings of the sensor is detected.

In one preferred embodiment, the data of audio information are stored as a data set with separately readable data sequences in order, for example, to replay a talking book in the form of individual chapters or to make the individual chapters of a talking book selectable. In one preferred embodiment, each data sequence of a data set can be read out separately and be used for driving the loudspeaker.

In one preferred embodiment, the device comprises a unit for receiving data from the internet and/or for transmitting data into the internet, particularly preferably an antenna for a wireless local area network (WLAN), a mobile data radio technology such as, for example, LTE, UMTS or the predecessors or successors thereof, or a connection socket for connecting a cable of a local area network that also has an internet access, for example a connection socket for an Ethernet cable. Owing to the presence of a unit for receiving data from the internet, there is the possibility of the control unit downloading from the internet the data containing the audio information to be replayed in a specific data format. In this way, the device can replay audio information that was not stored in the device before the sensor detects within the region of its surroundings a specific property or a specific change in a property of said surroundings or the control unit detects a specific change in the property detected by the sensor. In this case, the control unit may be designed in such a way that it receives the data from the internet and permanently stores them in a memory and the driving of the loudspeaker for replaying the audio information is performed on the basis of the data stored in the memory. Supplementarily or alternatively, it is conceivable for the control unit to directly use the data received from the internet in order to drive the loudspeaker for replaying audio information (so-called streaming), wherein this embodiment may also encompass the temporary buffer-storage of the data received from the internet in a buffer memory.

In embodiments that receive from the internet the data containing the items of audio information in a specific data format, it is conceivable, for example, for the control unit to keep available in a memory a specific server address of a server connected to the internet and to keep available in a memory a table in which a respective specific property or a respective specific change in a property is assigned to a respective identification number. In such an embodiment, the control unit is then designed, upon recognizing the specific property or the specific change in the property, to communicate with the concrete server and, having recourse to the identification number assigned to the specific property or the specific change in the property, to download from the server a specific data set and to use it for driving the loudspeaker for replaying the audio information resulting from said data. By way of example, music tracks may be stored as data in a specific data format on the server, wherein the respective music track, or the data containing said music track, is or are stored under a specific identification code on the server. In one preferred embodiment, the device according to the invention already contains an assignment table that assigns specific properties or changes in the properties of the region of the surroundings of the sensor to some, a plurality or, in one preferred embodiment, even all of the identification numbers that are also used on the database of the server. This enables the control unit to download data sets from the server in a targeted manner. Alternatively, it is conceivable for the control unit to be designed to communicate information containing the detected specific property, or information containing the detected specific change in the property, to a specific server that is connected to the internet. The assignment of the recognized specific property or of the recognized specific change in the property to specific audio information can then be performed on the server. The control unit is then designed to receive from the server data containing the audio information to be replayed. The server communicates to the device according to the invention the data which it has assigned to the specific property communicated by the control unit or to the specific change in the property communicated by the control unit. This embodiment avoids the need for keeping available an assignment table in the device according to the invention and thus increases the flexibility of the reception of specific data containing the audio information on the basis of a specific detected property or a specific detected change in a property of the region of the surroundings of the sensor. Such an embodiment makes it possible for example to increase the number of data sets provided on the server, without the need to adapt an assignment table in the control unit of the device according to the invention.

In one preferred embodiment, the control unit is designed to directly drive the loudspeaker for replaying the audio information. Particularly preferably no further start signals have to be fed to the control unit for driving the loudspeaker for replaying the audio information. It is conceivable in this case, however, for the control unit to delay the driving of the loudspeaker for replaying the audio information by means of a delay element.

In one preferred embodiment, the device according to the invention does not comprise an operating element with which an operator could influence the driving of the loudspeaker for replaying the audio information by means of the control unit if the sensor detects within the region of its surroundings a specific property or a specific change in a property of said surroundings or the control unit detects a specific change in the property detected by the sensor. In this embodiment, it is conceivable for operating elements to be provided in order to send to the control unit commands other than those for the initial driving of the loudspeaker for replaying the audio information, for example operating elements for setting the volume of the replay of the audio information via the loudspeaker.

It is likewise conceivable for operating elements to be provided in order, when replaying audio information that becomes on account of data of a data set with a separately readable data sequence, to jump from a first chapter to a next chapter. Moreover, in this embodiment it is conceivable for an operating element to be provided with which an operator can interrupt the replay after the initial driving of the loudspeaker for replaying the audio information by means of the control unit. In one preferred embodiment, therefore, an operating element is indeed provided. In this embodiment, however, the control unit can drive the loudspeaker for replaying the audio information solely by virtue of the sensor detecting within the region of its surroundings a specific property or a specific change in a property of said surroundings, and without an operator operating the operating element.

In an alternative embodiment, the device comprises an operating element and the control unit is designed in such a way that the control unit drives the loudspeaker for replaying the audio information only if the control unit receives a predetermined signal from said operating element. By way of example, said operating element may provide the start command for driving the loudspeaker for replaying the audio information. In one particularly preferred embodiment, however, said start command is the only start command necessary for starting the driving of the loudspeaker for replaying the audio information. Particularly preferably, in this embodiment no provision is made for using said operating element or a further operating element to generate further command signals that have to be fed to the control unit before the latter drives the loudspeaker for replaying the audio information. Particularly preferably, no operating elements are provided with which, from a plurality of data for audio information stored in a memory of the device, a data set is selected for the replay. Particularly preferably, in this embodiment, the data set to be replayed is selected solely on the basis of the specific property detected by the sensor, or the specific change—detected by the sensor—in the property of the region of the surroundings of the sensor, or on the basis of the specific change—detected by the control unit—in the property detected by the sensor. Such an embodiment simplifies operation particularly in comparison with MP3 players which are known from the prior art and in which, for replaying a specific item of audio information, the audio information must firstly be selected from a list.

In one preferred embodiment, the control unit may be designed in such a way that it interrupts the driving of the loudspeaker for replaying the audio information as soon as the sensor no longer detects within the region of its surroundings the specific property or the specific change in the property, or the control unit no longer detects the specific change in the property detected by the sensor. The interruption may be effected particularly preferably immediately, in a time-delayed manner or by means of a gradual reduction in the volume. What may be brought about thereby, for example, is that if an RFID transponder used in one preferred embodiment is removed from the region of the surroundings of the sensor, the replay of the audio information is interrupted. Alternatively, it is conceivable to configure the control unit in such a way that the replay of the audio information is continued even if the sensor no longer detects within the region of its surroundings the specific property or the specific change in the property or the control unit no longer detects the specific change in the property detected by the sensor.

In one preferred embodiment, the device comprises an antenna for a wireless local area network (WLAN), which antenna can be switched off. Particularly if the device according to the invention for replaying the audio information is intended to be used by children, there may be an interest in reducing the electromagnetic waves generated in the environment of the child. For this purpose it may be expedient to switch off the WLAN antenna.

In one preferred embodiment, the device according to the invention is embodied in a cubic fashion. The device according to the invention may also have other shapes, for example spherical, or may assume for example the shape of larger objects particularly preferred for children, such as, for example, the shape of a ship, a locomotive, a house or an animal, such as an elephant, for example.

In one preferred embodiment, the device comprises a receptacle for an identification carrier, said receptacle being identified optically, haptically and/or by a shoulder in the surface, for example a depression or elevation. In one preferred embodiment, the device provides for mechanically or magnetically releasably fixing the identification carrier. As described in greater detail below in connection with the system according to the invention, the device according to the invention is used particularly preferably as part of a system in which the device interacts with an identification carrier, in which the identification carrier has a property that can be detected by the sensor if the identification carrier is situated within the region of the surroundings of the sensor, or the identification carrier changes a property of the surroundings of the sensor and the sensor can detect this change. If the device according to the invention is embodied with an identified receptacle, then there is the possibility of positioning the identification carrier in said receptacle. By providing a receptacle, it is furthermore possible to demarcate a region within which the sensor is designed to detect in this region of its surroundings a specific property or a specific change in a property. The provision of a receptacle makes it possible to design the device according to the invention in one preferred embodiment such that the sensor can detect the property of its surroundings only in the region of the receptacle, or can detect the change in a property of said surroundings only in the region of the receptacle. Undesired incorrect operation can thus be precluded. In the system according to the invention described in greater detail below, the sensor can even be designed such that the control unit drives the loudspeaker for replaying audio information only if the identification carrier is positioned in the receptacle.

In one preferred embodiment, the device comprises an operating element in the form of a rocker, with which the volume of the replay of the audio information can be influenced by virtue of the fact that the rocker in a first position transmits a first signal to the control unit, for example a signal for increasing the volume of the replay of the audio information, and the rocker in a second position transmits a second signal to the control unit, for example a signal for reducing the volume of the replay of the audio information. Furthermore, such a rocker may have a neutral central position in which no signal influencing the volume is transmitted to the control unit. Alternatively, it is conceivable for the device to comprise a first operating element, with which signals for increasing the volume of the replay of the audio information can be communicated to the control unit, and for the device to comprise a second operating element, with which signals for reducing the volume of the replay of the audio information can be transmitted to the control unit. In one particularly preferred embodiment, the operating element that influences the increase of the volume is made larger than the operating element that influences the reduction of the volume of the replay of the audio information. In one particularly preferred embodiment, the two operating elements have the shape of ears which are fitted to a housing of a main body of the device, for example project from the housing. The ear-shaped operating elements can emit the signal to be generated by them for influencing the volume of the replay of the audio information upon carrying out a compressive movement or bending movement. This has the advantage that the user can recognize the function of the operating elements without having to rely on linguistic knowledge.

In one preferred embodiment, the device according to the invention comprises a display. Said display may be in particular an E-Ink display. The display may also be a touch-sensitive display. Supplementarily or alternatively, the device may comprise an LED or a sequence of LEDs.

In one preferred embodiment, the device comprises a proximity sensor, a movement sensor (acceleration sensor), a sensor for ambient light, a moisture sensor, an inclination sensor, a GPS sensor and/or a gyroscopic sensor. Said sensors allow the generation of further operating commands for the control unit. By way of example, a device designed in this way can recognize shaking and generate therefrom an operating signal for the control unit. By way of example, shaking of the device can be used to replay data of different items of audio information in a random order. Likewise, a device designed in this way can recognize whether the device is lightly tapped from the left or from the right. This can be used for example to jump within a data set to the next chapter or to a previous chapter. Likewise, a device configured in this way can recognize whether it is being thrown. Operating signals can be generated from this, too.

In one preferred embodiment, the device comprises a sensor that can generate a signal dependent on the distance between an object positioned in the region of the receptacle and the receptacle, for example an ultrasonic sensor. As a result, it becomes possible, in one preferred embodiment of the device, to make the driving of the loudspeaker dependent on this signal, for example on the object touching or almost touching the receptacle. Furthermore, in a supplementary or alternative embodiment, this makes it possible to generate further operating commands in response to a variation of the distance. By way of example, a brief removal and re-emplacement of the object may be used to jump within a data set to the next chapter.

A device oriented in this way can recognize whether it is tilted vertically or whether it is tilted horizontally. These signals can also be used for generating operating signals for the control unit. By way of example, vertical tilting can be used for navigation within a replay list, while horizontal tilting makes it possible to change between applications.

In one preferred embodiment, the device according to the invention comprises a data connection, for example a USB connection. Via such a connection, for example, a memory provided as part of the device in one preferred embodiment can be occupied by data containing audio information. It is likewise possible to connect the device according to the invention to a computer via such a connection, for example in order to configure the software of the device.

In one preferred embodiment, the device is clad with foam or some other elastic material. Particularly preferably, the device according to the invention is clad completely with foam or some other elastic material, or, in one embodiment comprising a display, is not clad with foam or an elastic material only in the region of the display. The cladding firstly protects the further components of the device. The cladding secondly protects children against injuries.

In one preferred embodiment, the device according to the invention comprises an energy store, in particular a battery, particularly preferably a rechargeable battery. In one preferred embodiment, the device according to the invention is embodied in such a way that the battery can be charged wirelessly, for example by means of inductive energy transmission. This affords the advantage that the charging station can be embodied in a manner appropriate for children, for example in the form of a charging cradle into which the device according to the invention has to be placed by itself for charging purposes. This avoids the need for children to handle electrical cables in order to charge the battery of the device according to the invention.

In one preferred embodiment, the device according to the invention can generate light, for example in order to function as a night light.

In one preferred embodiment, the device according to the invention comprises a housing in which the sensor is thus arranged, wherein the region of the surroundings of the sensor in which the sensor can detect a property or a change in a property of said surroundings extends beyond a surface of the housing not further than 1 m, particularly preferably not further than 150 mm, particularly preferably not further than 100 mm, particularly preferably not further than 50 mm, particularly preferably not further than 10 mm, particularly preferably not further than 5 mm. This affords the advantage that the property or the change in the property that is intended to be detected by the sensor in order that the control unit drives the loudspeaker for replaying the audio information is recognized only in a narrow region around the housing of the device. This avoids incorrect operations.

In one preferred embodiment, the device is produced from incombustible material or material of low combustibility.

In one preferred embodiment, the device comprises a microphone or a connection possibility for incoming audio signals, for example from a microphone. This makes it possible to control the device by voice or to make recordings.

Particularly preferably, the device can be linked into a wireless local area network via a WLAN antenna and receive control commands via the WLAN antenna, for example can be controlled via a smartphone or a PC. In one preferred embodiment, these control commands are not control commands with which the user can influence the beginning of the replay of the audio information. Likewise, the device according to the invention can be designed to be operated via a remote control.

In one preferred embodiment, the device according to the invention comprises a camera. If the device according to the invention is embodied for example as a night light, then the camera can perform a monitoring function for the child lying next to the device, by virtue of the fact that the camera can be driven from a smartphone, for example, and the image recorded by the camera can be replayed on a display such as a television, a smartphone or other mobile display. Supplementarily or alternatively, the audio information recorded by a microphone or the audio information fed in by a connection possibility can be replayed on a loudspeaker or smartphone by this route.

It is likewise possible for a device linked into a wireless local area network via a WLAN antenna to transfer the audio information to be replayed to other subscribers of the network, for example to stream it to a television or some other loudspeaker.

In one preferred embodiment, the operating system of the control unit is Firefox OS. In one preferred embodiment, the operating system of the control unit can be updated by means of updates.

In one preferred embodiment, the control unit is designed to determine and document information about the driving of the loudspeaker, for example the frequency with which specific items of audio information were played back or the order in which specific items of audio information were played back. Particularly preferably, the device is designed to communicate such information to a server.

In one preferred embodiment, the device comprises means for supplying an identification carrier described below with current, preferably without electrical contact, for example by induction.

The system according to the invention comprises a device according to the invention and an identification carrier, wherein the identification carrier has a property that can be detected by the sensor if the identification carrier is situated within the region of the surroundings of the sensor, or the identification carrier changes a property of the surroundings of the sensor. A basic concept of the system according to the invention is that the control unit drives the loudspeaker for replaying audio information if a specific identification carrier is brought into the region of the surroundings of the sensor in which the sensor can detect a property or a change in a property. In this case, in one particularly preferred embodiment, however, just bringing the identification carrier into said region is intended to trigger the driving of the loudspeaker for replaying the audio information, without further operating commands having to be generated.

This basic concept of the system according to the invention considerably simplifies the operation of devices for replaying audio information. It is now no longer necessary to handle scratchable CDs, as is necessary in the case of the CD players known from the prior art, or to learn the complex operating sequences of operating elements necessary for driving the loudspeakers for replaying audio information in the case of the MP3 players known from the prior art. In the simplest embodiment of the invention it suffices to bring the identification carrier into the region of the surroundings of the sensor in which the latter can detect the property or a change in the property, and thus to trigger automatically the driving of the loudspeaker for replaying the audio information by means of the control unit.

In one preferred embodiment, the identification carrier has an RFID transponder or an antenna with which a modulated wave can be emitted and/or received. As a result, the identification carrier according to the invention can be configured for example in such a way that it can communicate with the device according to the invention via the Bluetooth standard or via the NFC standard. Particularly the use of these technologies allows a diversity of communication possibilities between the identification carrier and the device. In particular, the use of these technologies allows a multiplicity of identifications to be recognized. It thereby becomes possible for the device according to the invention to select from a multiplicity of items of audio information the audio information that is intended to be replayed, for example if each item of audio information to be replayed is assigned its own identification, for example in an assignment table stored in the device according to the invention or on a server.

Alternatively, it is conceivable for the identification carrier to have a magnet, for example, which generates a magnetic field having a specific strength if the identification carrier is brought into the region of the surroundings of the sensor. It is likewise possible to use a magnet to generate a magnetic field having a field direction that deviates from a preferred direction.

In one preferred embodiment, the identification carrier has a magnet and the device has a surface to which the magnet can adhere. Alternatively, the device can have a magnet and the identification carrier a surface by which the identification carrier can adhere to the magnet. As a result, the device and the identification carrier can be releasably connected to one another. This allows the device to be moved, without the identification carrier losing a specific relative position relative to the device.

In one preferred embodiment, the identification carrier has the form of a figure, in particular the form of a human figure or of an animal figure or of a fantasy figure. Particularly preferably, the identification carrier has the form of a figure having feet. Particularly preferably, in the case of an identification carrier having the form of a figure having feet, the magnet is arranged in the feet of the figure, such that the figure can stand on the device according to the invention.

In one preferred embodiment, the identification carrier is embodied in the manner of a figure, but does not have a pedestal on which the figure stands.

In one preferred embodiment, the identification carrier is not mechanically fixable to the device. Particularly preferably, the device and the identification carrier do not have a system comprising plug and socket with which the identification carrier could be connected to the device.

In one preferred embodiment, the identification carrier is configured such that the operator can associate it with specific audio information on the basis of its shape, colouration, surface structure and/or its material, and that upon being brought into the region of the surroundings of the sensor in which the latter can detect a property or a change in a property of said surroundings, this triggers the driving of the loudspeaker for replaying audio information related to the association of the user in terms of contents. The identification carrier can for example be embodied in the manner of a figure and trigger the replay of audio information associated with the form of the figure. By way of example, the figure can have the form of Benjamin Blümchen® and the replayed audio information can be an audio story with Benjamin Blümchen® as the protagonist. It is likewise conceivable that the identification carrier can be individually adapted. By way of example, the identification carrier can be embodied as a figure which resembles the form of a person in relatively close proximity to another person and the replayed audio information can be audio information previously recorded by this person. It is likewise conceivable for the identification carrier to have the form of a figure resembling a scientist, and for the audio information to have contents of the scientist's discoveries. It is furthermore conceivable for the figure to resemble a composer or artist and for the audio information to contain contents from said composer or artist. It is conceivable for an identification carrier to trigger the audio information with respect to one piece of music, a collection of pieces of music (album) or a playlist.

In a supplementary or alternative embodiment, the identification carrier is configured as a sticker or module that can be secured on other objects.

In one preferred embodiment, the identification carrier is embodied such that the data stored on it can be altered. In another preferred embodiment, the identification carrier is embodied such that the data stored on it cannot be altered. In a further preferred embodiment, the identification carrier is embodied such that the data stored on it can be altered only once, and not any longer after that. In one preferred embodiment, an initially alterable identification carrier is configured such that it can become an unalterable identification carrier by means of a specific processing, preferably such that it cannot be converted back again to an alterable identification carrier. The processing may preferably be of mechanical type, for instance severing or connection of specific electrical lines. In supplementary or alternative embodiments, the processing may be effected by visible light, by invisible electromagnetic waves (such as, for example, radio signals, ultraviolet light), by a magnetic, electrical and/or by a thermal pulse. In one preferred embodiment, the identification carrier is embodied such that it can be secured in or on other articles, such as a figure, for example, by means of a clicking mechanism. After this process, the article overall can be regarded as an identification carrier. In one particularly preferred embodiment, the identification carrier is configured such that it can be made unalterable by means of a mechanical processing which can be combined with the movement for actuating the clicking mechanism for connecting the identification carrier to an article, for example such that the processing can be performed simultaneously with the clicking into the article.

In one preferred embodiment, the identification carrier is embodied such that it can be supplied with current for the operation of active electronic components by induction. In one preferred embodiment, the identification carrier is embodied such that it contains active electronic components which provide a data memory. Said data memory is preferably non-volatile. In one preferred embodiment, the data memory is embodied such that it can provide an identification and/or audio information which can be the basis for the alteration of properties of the surroundings. By virtue of the fact that audio information stored on the identification carrier is transmitted to the device, the device can replay audio information that was not stored in the device before the sensor detects within the region of its surroundings a specific property or a specific change in a property of said surroundings or the control unit detects a specific change in the property detected by the sensor. In one preferred embodiment, the identification carrier has active electronic components suitable for altering properties of the surroundings which can be converted into data again by a sensor and a control unit. In one preferred embodiment, the identification carrier has a processor. In one preferred embodiment, the identification carrier also has a data receiving unit.

An identification carrier can also be advantageous independently of the purpose of replaying audio information. For storing and transmitting data generally one embodiment may be configured such that it comprises an antenna for electromagnetic waves,
- an active electrical component containing a non-volatile data memory having memory space of at least one megabyte,
- a transmitting unit designed such that it can transmit data from the non-volatile data memory via the antenna,
- an energy receiving unit that can receive energy and convert it into enough current to supply the data memory and the transmitting unit with current, such that a permanent energy store is not required for the data transmitting process, wherein the energy receiving unit is different from the antenna,
- a controlling unit that is ready to read out data from the data memory and to transmit the data via the transmitting unit.

Particularly preferably, the controlling unit indicates contactlessly the readiness to read out data from the data memory and to transmit the data via the transmitting unit as soon as the energy receiving unit makes enough energy available for this, and transmits data from the data memory wholly or partly via the transmitting unit in response to contactless request. The aspects of individual embodiments of an identification carrier as described above and below can also be applied to such a generally usable identification carrier, wherein the driving of a loudspeaker is respectively replaced by the processing or display of the data stored on the identification carrier. In one preferred embodiment, the data memory has a memory space of at least 500 megabytes, 1 gigabyte or 4 gigabytes.

In one preferred embodiment, the identification carrier is embodied in such a way that it can generate within a region of the surroundings of the sensor only one specific property or only one specific change in a property of said surroundings and can thus only bring about the effect that the control unit drives the loudspeaker for replaying a specific item of audio information. In such an embodiment of the system it is provided that additional identification carriers have to be procured or kept available in order to replay additional items of audio information. The invention in this embodiment thus departs from the principle often to be found in MP3 players from the prior art, namely that of combining as many functions as possible or as many items of audio information as possible in one appliance in such a way that they are accessible in each case via specific operating sequences but without addition of further devices. In relation to such MP3 players, the system according to the invention in the embodiment described here is configured in a more complex fashion since a multiplicity of identification carriers have to be kept available in order to replay different items of audio information. It has been found here, however, that there is a need for a simple operating concept in which the number of identification carriers to be kept available is increased in favour of simple playback of the one item of audio information assigned to the identification carrier. By way of example, this embodiment makes it possible to construct a toy system in which, although identification carriers embodied like figures are in each case only suitable for identifying a specific piece of music assigned to them or a specific spoken story assigned to them, which is played back by driving the loudspeaker of the toy, it is possible, by choosing the figure and on account of the simplified operating concept, which in a preferred embodiment allows the immediate playback of the piece of music or of the spoken story as soon as the identification carrier has generated within a region of the surroundings of the sensor the corresponding one property or the corresponding one change in a property of said surroundings, for the children themselves to choose which piece of music or which spoken story is to be replayed. The as a result of the generation of the one corresponding property or of the one corresponding change in a property of said surroundings can, for the purpose of replaying the audio information, identify a data set having separately readable data sequences in order, for example, by means of the one identification carrier, to identify a talking book in the form of individual chapters and to make the individual chapters of a talking book selectable, or to identify the individual episodes of a serial or of a series.

Particularly preferably, the identification carrier has no operating element that can be used to influence the manner in which the identification carrier can generate within a region of the surroundings of the sensor a property or only a change in a property of said surroundings. This embodiment is particularly well suited to applications in which the identification carrier is embodied in such a way that it can generate within a region of the surroundings of the sensor only one specific property or only one specific change in a property of said surroundings and can thus only bring about the effect that the control unit drives the loudspeaker for replaying a specific item of audio information. Supplementarily or alternatively, the identification carrier can have an operating element which can be used to generate within the region of the surroundings of the sensor not only one but a plurality of specific properties or specific changes in a property of said surroundings, which are detected by the sensor, and with which the control unit can change the manner in which the audio information is replayed, for example the volume of the replay or control commands for selecting the next or previous chapter or piece of music. In this regard, by actuating the operating element of the identification carrier, for example by turning an arm or a head of an identification carrier embodied as a figure, it is possible to change the manner in which the audio information is replayed, for example the volume of the replay.

In one preferred embodiment, the identification carrier has no energy stores, particularly preferably no permanent energy stores such as a battery, for example, particularly preferably no energy stores with the exception of a capacitor.

The method according to the invention for replaying audio information is carried out with a device comprising
- a loudspeaker or a loudspeaker connection,
- a sensor that can detect within a region of its surroundings a property or a change in a property of said surroundings,
- a support on which an article can be permanently positioned, wherein the sensor can detect at least in a region above the support a property or a change in a property of said region, and/or a securing means on which an article can be permanently secured, wherein the sensor can detect at least in a region adjacent to the securing means a property or a change in a property of said region,
- a control unit, wherein the control unit drives the loudspeaker or the loudspeaker connection for replaying audio information whose replay lasts particularly preferably at least 10 s if the sensor detects within the region of its surroundings a specific property or a specific change in a property of said surroundings or if the control unit detects a specific change in the property detected by the sensor.

The method according to the invention for replaying image, video or 3D information is carried out with a device comprising
- a display for image, video or 3D information or a connection for such a display,
- a sensor that can detect within a region of its surroundings a property or a change in a property of said surroundings,
- a support on which an article can be permanently positioned, wherein the sensor can detect at least in a region above the support a property or a change in a property of said region, and/or a securing means on which an article can be permanently secured, wherein the sensor can detect at least in a region adjacent to the securing means a property or a change in a property of said region,
- a control unit wherein the control unit drives the display or the connection for the display for replaying image, video or 3D information if the sensor detects within the region of its surroundings a specific property or a specific change in a property of said surroundings or if the control unit detects a specific change in the property detected by the sensor.

The method according to the invention for executing software is carried out with a device comprising
- a processor that can execute the software,
- a sensor that can detect within a region of its surroundings a property or a change in a property of said surroundings,
- a control unit, wherein the control unit drives the processor for executing the software if the sensor detects within the region of its surroundings a specific property or a specific change in a property of said surroundings or if the control unit detects a specific change in the property detected by the sensor.

The identification carrier according to the invention is suitable for being used with a device according to the invention in a system according to the invention or in a method according to the invention.

BRIEF DESCRIPTION OF THE DRAWINGS

The invention is explained in greater detail below with reference to drawings that illustrate embodiments of the invention.

In the drawings.

DETAILED DESCRIPTION

Figure 1:
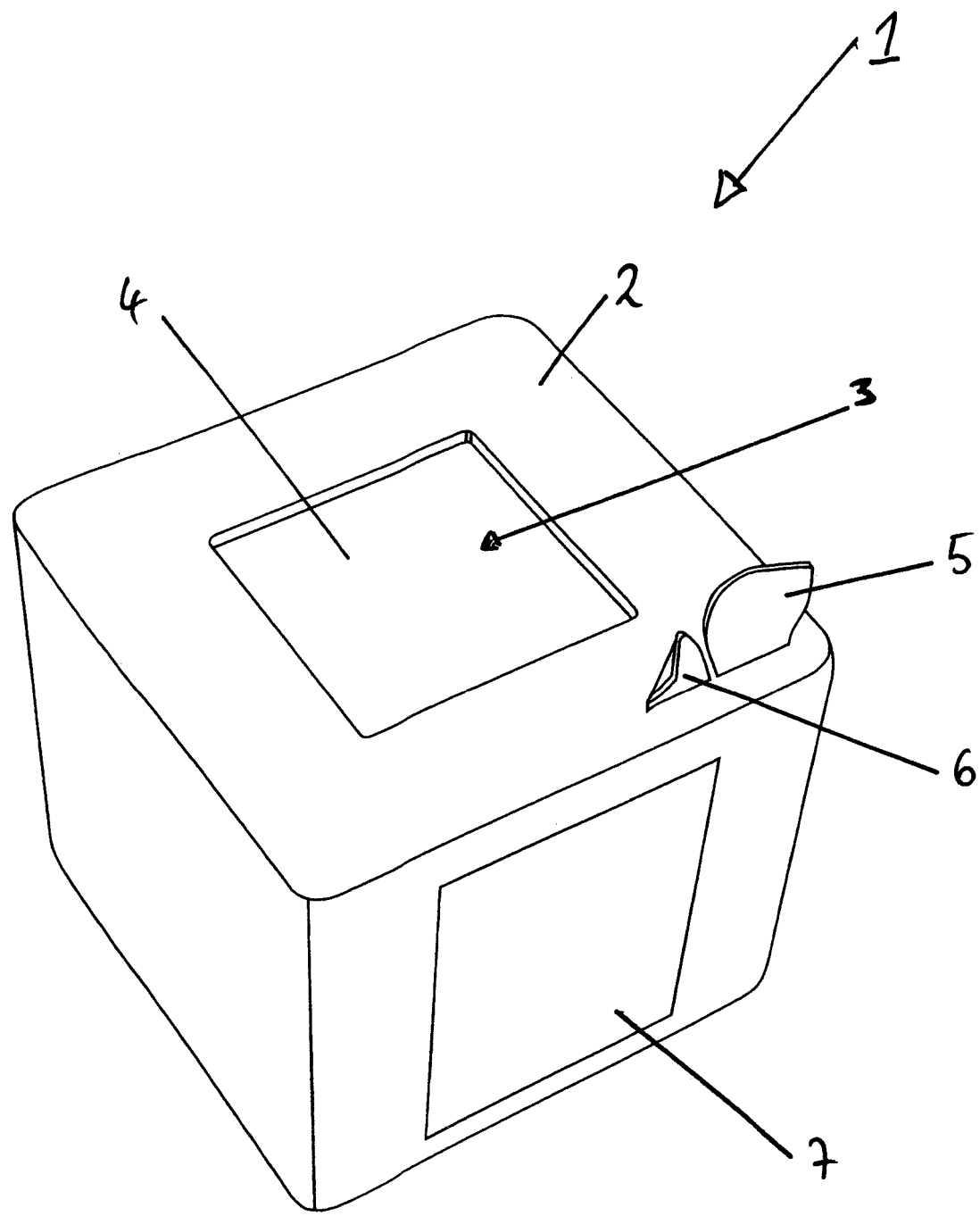
FIG. 1 shows a perspective view of the device according to the invention for replaying audio information.

FIG. 1 shows the device according to the invention for replaying audio information. The device 1 comprises a loudspeaker, which is not illustrated in more specific detail in the perspective view in FIG. 1. Furthermore, the device 1 comprises a depression 3 at its top side 2. A sensor (not illustrated in more specific detail) is arranged in the interior of the device 1, below the depression 3, which sensor can detect within the region of the depression 3 a property or a change in a property of these surroundings, namely can read a passive RFID transponder (cf. FIG. 2). Furthermore, the device comprises a control unit (not illustrated in more specific detail) that can drive the loudspeaker for replaying audio information if the sensor detects within the region of its surroundings a specific property or a specific change in a property of said surroundings or the control unit detects a specific change in the property detected by the sensor.

The sensor is arranged within the housing of the device 1 in such a way that the region of the surroundings of the sensor in which the sensor can detect a property or a change in a property of said surroundings extends no further than 100 mm upwards beyond the base surface 4 of the depression 3.

The device according to the invention comprises a first operating element 5 embodied in the shape of an ear, and a second operating element 6 likewise embodied in the shape of an ear. The operating element 5 is configured such that it is larger than the operating element 6. Both the operating element 5 and the operating element 6 can perform a tilting movement relative to the rest of the housing of the device 1 and pivot back into the basic position illustrated in FIG. 1.

Furthermore, the device 1 comprises a display 7.

Figure 2:
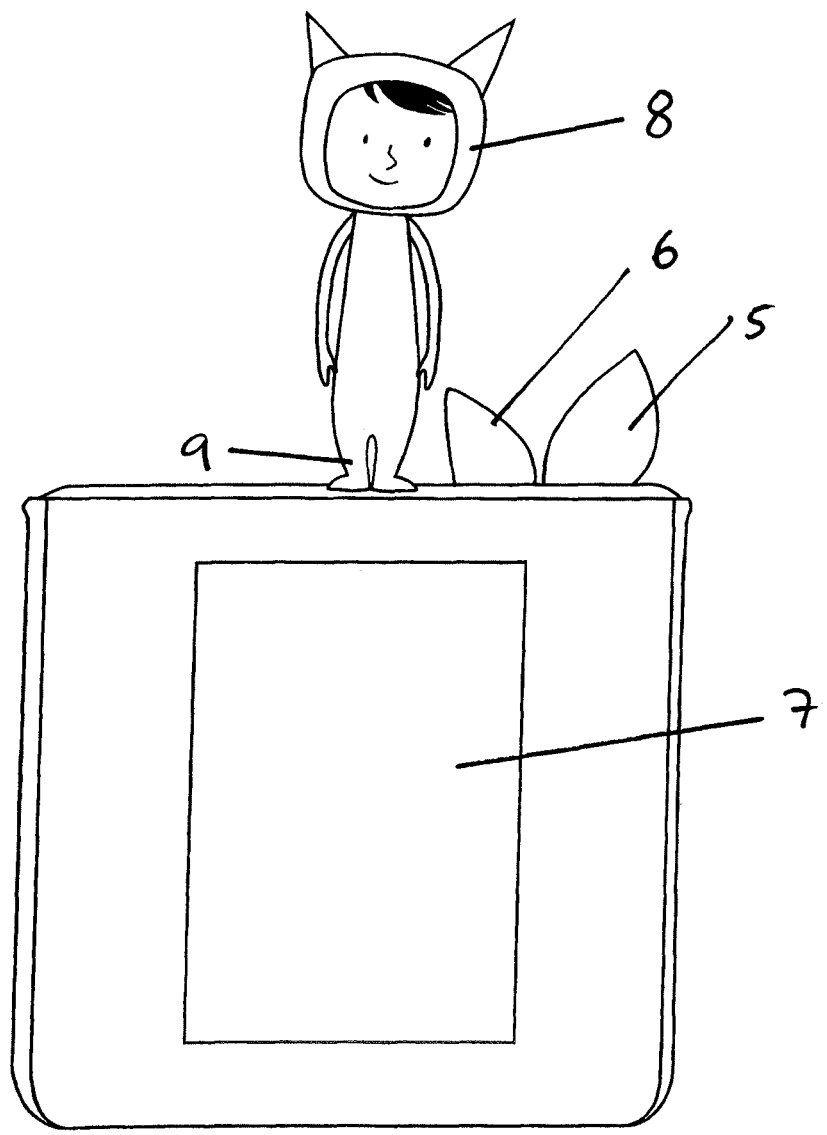
FIG. 2 shows a frontal view of a system according to the invention consisting of a device according to the invention in accordance with FIG. 1 and an identification carrier.

The system illustrated in FIG. 2 comprises, besides the device illustrated in FIG. 1, an identification carrier 8 embodied in the form of a figure. The identification carrier 8 embodied as a figure has legs 9 and feet and no pedestal to which the feet 9 would be fixedly connected. Magnets (not illustrated in more specific detail) are provided in the feet of the identification carrier 8 embodied as a figure. Said magnets can interact with magnets or metal objects arranged directly below the base surface 4 of the depression 3, such that the identification carrier 8 can be fixedly held releasably on the baseplate 4 of the depression 3.

The operation of the system according to the invention is performed as follows:

FIG. 1 shows the device according to the invention in a basic state in which, in the embodiment illustrated here, it does not replay audio information. The sensor permanently or periodically monitors the region of the depression 3 to determine whether said region has a specific property or a specific change in a property. In the embodiment illustrated here, the sensor monitors the region of the depression 3 to determine whether a specific RFID transponder is brought into the region of the depression. This is not the case in the operating situation illustrated in FIG. 1, and so the device 1 does not replay audio information.

FIG. 2 shows the operating situation in which the system according to the invention has been completed by addition of the identification carrier 8. The identification carrier 8 is placed onto the baseplate 4 of the depression 3 and adheres there by means of the magnets provided in the feet of the identification carrier 8. The identification carrier 8 has an RFID transponder (not illustrated in more specific detail). By virtue of the fact that the identification carrier 8 has now been brought into the region of the surroundings of the sensor that is monitored by the sensor, said region now has a specific property detectable by the sensor. The sensor recognizes the presence of the RFID transponder in the identification carrier 8 and conveys this to the control unit (not illustrated in more specific detail) by means of a signal. The control unit thereupon drives the loudspeaker for replaying audio information, without the need for actuation of a further operating element.

The sensor reads out an identification from the RFID transponder of the identification carrier 8 and conveys said identification to the control unit. On the basis of an assignment table stored in the control unit, the control unit assigns the identification read out by the sensor to a specific data set containing a specific item of audio information in a memory (not illustrated in more specific detail) of the device 1. The control unit thereupon drives the loudspeaker in order to replay the audio information contained in the specific data read out from the memory by the control unit. Said audio information is a piece of music whose replay lasts at least 10 s.

If the control unit detects that the data set corresponding to the identification is not yet stored in the memory of the device, the control unit, over a device not shown in further detail, creates a connection to the server. On this server, the control unit identifies itself in that it communicates to the server a device identification of the device, specifically in this embodiment the processor identification of the processor of the control unit. In addition, the control unit informs the server which data packet is to be loaded from an external memory into the memory of the device. If, after checking the device identification, the server determines that the device is authorised to load the data packet from the external memory into a memory of the device, the server releases this data packet for transmission and transmits the data packet from the external memory to a memory of the device.

The invention claimed is:

1. A toy for replaying music or a spoken story comprising:
   (a) a loudspeaker or a loudspeaker connection,
   (b) a sensor configured to detect within a region of its surroundings one or more properties of an electromagnetic wave, or a change in the one or more properties, indicative of a presence of an identification carrier within the region,
   (c) a storage device storing a device identifier for the toy;
   (d) a communication device configured to transmit a signal dependent upon the device identifier to an external control unit configured to transmit data to the toy responsive to the external control unit determining, based upon the signal dependent upon the device identifier, that the toy is authorized to receive the data; and
   (e) a control unit configured to:
      determine whether a condition detected by the sensor corresponds to one or more properties of an electromagnetic wave, or the change in the one or more properties, indicative of the presence of an identification carrier within the region;
      responsive to a determination that the detected condition corresponds to the one or more properties, or the change in the one or more properties, of the electromagnetic wave indicative of the presence of the identification carrier within the region:
         transmit, by the communication device to an external control unit, a signal dependent upon the device identifier for the toy stored in the storage device;
         responsive to a determination by the external control unit, in response to receipt by the external control unit of the signal dependent upon the device identifier for the toy, that the toy is authorized to receive a data packet:
            receive, by the communication device from the external control unit, the data packet; and
            based upon the data packet received from the external control unit, drive the one of the loudspeaker and the loudspeaker connection to replay music or a spoken story.

2. A device for replaying image, video or 3D information comprising:
   (a) a device display for image, video or 3D information or a connection for such a display,
   (b) a device sensor, which can detect within a region of its surroundings one or more properties of an electromagnetic wave, or a change in the one or more properties, indicative of a presence of an identification carrier within the region,
   (c) a storage device storing a device identifier for the device, the device identifier comprising one of (i) an identification for a device processor, (ii) an identification of a memory chip of the storage device, and (iii) identification information corresponding to a tag for an RFID transponder in the device;
   (d) a communication device configured to transmit a signal dependent upon the device identifier to an external control unit configured to transmit data to the toy responsive to the external control unit determining, based upon the signal dependent upon the device identifier, that the toy is authorized to receive the data; and
   (e) a device control unit configured to:
      determine whether a condition detected by the device sensor corresponds to one or more properties of an electromagnetic wave, or the change in the one or more properties, indicative of the presence of the identification carrier within the region;
      responsive to a determination that the detected condition corresponds to the one or more properties, or the change in the one or more properties, of the electromagnetic wave indicative of the presence of the identification carrier within the region:
         transmit, by the communication device to an external control unit, a signal dependent upon the device identifier for the toy stored in the storage device;
         responsive to a determination by the external control unit, in response to receipt by the external control unit of the signal dependent upon the device identifier for the toy, that the toy is authorized to receive a data packet:
            receive, by the communication device from the external control unit, the data packet; and
            based upon the data packet received from the external control unit, drive the device display for the image, the video or the 3D information or the connection for such a display.

3. The toy according to claim 1, wherein the sensor comprises one of an inductive sensor, a magnetic field sensor, a capacitive sensor, a piezoelectric sensor, an electrochemical sensor or a temperature sensor.

4. The toy according to claim 1, wherein the sensor comprises a reading device configured for communicating with a passive RFID transponder or an active RFID transponder.

5. A system for replaying music or a spoken story comprising:
   (i) a toy including:
      (a) a toy loudspeaker or a toy loudspeaker connection,
      (b) a toy sensor configured to detect within a region of its surroundings one or more properties of an electromagnetic wave, or a change in the one or more properties, indicative of a presence of an identification carrier within the region, (c) a toy storage device storing a device identifier for the toy, the device identifier comprising one of (i) an identification for a toy processor, (ii) an identification of a memory chip of the storage device, and (iii) identification information corresponding to a tag for an RFID transponder in the toy;

(d) a toy communication device configured to transmit a signal dependent upon the device identifier to an external control unit configured to transmit data to the toy responsive to the external control unit determining, based upon the signal dependent upon the device identifier, that the toy is authorized to receive the data packet; and (e) a control unit configured to:
  determine whether a condition detected by the toy sensor corresponds to one or more properties of an electromagnetic wave, or the change in the one or more properties, indicative of the presence of the identification carrier within the region;
  responsive to a determination that the detected condition corresponds to the one or more properties, or the change in the one or more properties, of the electromagnetic wave indicative of the presence of the identification carrier within the region:
    transmit, by the toy communication device to an external control unit, a signal dependent upon the device identifier for the toy stored in the storage device;
    responsive to a determination by the external control unit, in response to receipt by the external control unit of the signal dependent upon the device identifier for the toy, that the toy is authorized to receive a data packet:
      receive, by the toy communication device from the external control unit, the data packet; and
      based upon the data packet received from the external control unit, drive a playback signal to the one of the toy loudspeaker and the toy loudspeaker connection to replay music or a spoken story; and (ii) the identification carrier, wherein the identification carrier is configured to cause the presence of the one or more properties of the electromagnetic wave, or the change in the one or more properties, indicative of the presence of the identification carrier, which the sensor can detect in the region of its surroundings.

6. The system according to claim 5, wherein the identification carrier comprises at least one of an RFID transponder or an antenna and is configured to at least one of emit or receive a modulated wave.

7. The system according to claim 6, further comprising an external memory configured to transmit the data packet to the toy storage device from the external control unit.

8. A method for replaying audio information on a toy comprising:
  detecting, with a toy sensor in the toy, a condition within a predetermined region detectable by the toy sensor;
  determining, by a toy control unit in the toy, whether the detected condition corresponds to one or more properties of an electromagnetic wave, or a change in the one or more properties, indicative of a presence of an identification carrier within the region;
  responsive to a determination, by the toy control unit in the toy device, that the detected condition corresponds to the one or more properties, or the change in the one or more properties, of an electromagnetic wave indicative of a presence of an identification carrier within the region:
    transmitting, by a toy communication device in the toy to an external control unit, a signal dependent upon a device identifier for the toy stored in a toy storage device of the toy, wherein the device identifier comprises one of (i) an identification for a processor of the toy, (ii) an identification of a memory chip of the toy storage device, and (iii) identification information corresponding to a tag for an RFID transponder in the toy; and
    responsive to a determination by the external control unit, in response to receipt by the external control unit of the signal dependent upon the device identifier for the toy, that the toy is authorized to receive a data packet:
      receiving, by the toy communication device from the external control unit, the data packet; and
      based upon the data packet sent to or received from the external control unit, drive one of a toy loudspeaker and a toy loudspeaker connection of the toy to replay audio information.

9. The method of claim 8, further comprising forming a communication channel between an external communication device and the toy communication device responsive to the determination that the detected condition corresponds to the one or more properties, or the change in the one or more properties, of an electromagnetic wave indicative of a presence of the identification carrier within the region.

10. The method of claim 8, further comprising transmitting, by the toy control unit to the external control unit, data indicative of utilization statistics of the toy and playback statistics of the toy comprising one or more of a frequency each content was played, how long each content was played, a charging status of the control unit, and a charging status of the toy.

11. The toy of claim 1, wherein the control unit is configured to establish a connection to the external control unit before transmitting the signal dependent upon the device identifier.

12. The toy of claim 1, wherein, when the external control unit determines, based upon the signal dependent upon the device identifier, that the toy is authorized to load a data packet from an external memory into the storage device, the external control unit releases the data packet for transmission and transmits the data packet from the external memory to the storage device.

13. The toy of claim 12, wherein the control unit is further configured to play content corresponding to the received data packet.

14. The device of claim 2, wherein the control unit is configured to establish a connection to the external control unit before transmitting the signal dependent upon the device identifier.

15. The device of claim 2, wherein, when the external control unit determines, based upon the signal dependent upon the device identifier, that the device is authorized to load a data packet from the external memory into the storage device, the external control unit releases the data packet for transmission and transmits the data packet from an external memory to the storage device.

16. The toy of claim 1, wherein the storage device stores music or a spoken story playable by the toy, and wherein the data packet comprises control information comprising permission for the toy to replay the stored music or the spoken story.

* * * * *